US007253789B2

(12) United States Patent
Kingsley et al.

(10) Patent No.: US 7,253,789 B2
(45) Date of Patent: *Aug. 7, 2007

(54) DIELECTRIC RESONATOR ANTENNA

(75) Inventors: Simon Philip Kingsley, Stow-cum-Quy (GB); Steven Gregory O'Keefe, Chambers Flat (AU); Tim John Palmer, Stow-cum-Quy (GB); James William Kingsley, Stow-cum-Quy (GB)

(73) Assignee: Antenova Ltd., Cambridge (GB)

( * ) Notice: Subject to any disclaimer, the term of this patent is extended or adjusted under 35 U.S.C. 154(b) by 0 days.

This patent is subject to a terminal disclaimer.

(21) Appl. No.: 10/509,056

(22) PCT Filed: Mar. 26, 2003

(86) PCT No.: PCT/GB03/01326

§ 371 (c)(1),
(2), (4) Date: Sep. 24, 2004

(87) PCT Pub. No.: WO03/081719

PCT Pub. Date: Oct. 2, 2003

(65) Prior Publication Data

US 2005/0225499 A1 Oct. 13, 2005

(30) Foreign Application Priority Data

Mar. 26, 2002 (GB) .................................... 0207052

(51) Int. Cl.
*H01G 15/08* (2006.01)

(52) U.S. Cl. ................ 343/911 R; 343/753; 343/911 L

(58) Field of Classification Search ......... 343/700 MS, 343/753, 911 L, 911 R
See application file for complete search history.

(56) References Cited

U.S. PATENT DOCUMENTS 3,972,043 A * 7/1976 Locus ......................... 342/11

(Continued)

FOREIGN PATENT DOCUMENTS

| | | |
|---|---|---|
| CA | 2201048 | 3/1997 |
| EP | 0801436 A2 | 10/1997 |
| GB | 2268626 A | 1/1994 |
| JP | 20000036708 | 2/2000 |

OTHER PUBLICATIONS

Birand, M.T. and Gelsthorpe, R.V.: "Experimental millimetric array using dielectric radiators fed by means of dielectric waveguide", Electronics Letters, 1983, 17, (18), pp. 633-635.

(Continued)

*Primary Examiner*—Tan Ho
(74) *Attorney, Agent, or Firm*—Pearl Cohen Zedek Latzer, LLP

(57) ABSTRACT

There is disclosed a dielectric resonator antenna adapted to resonate in an $EH_{11\delta}$ resonance mode, and also a method for the manufacture thereof. The desired resonance mode is achieved by careful positioning of a dielectric resonator (2) on a grounded substrate (1), the resonator (2) being fed by way of a microstrip feed line (9) and a slot (6) in the grounded substrate (1). Because the $EH_{11\delta}$ resonance mode has nulls in a direction of longitudinal extension of the dielectric resonator (2), a plurality of antenna can be placed end-to-end so as to form an array with reduced coupling between adjacent antennas and with vertical polarisation, which is desirable for mobile communications applications.

29 Claims, 6 Drawing Sheets

U.S. PATENT DOCUMENTS

| | | | | | |
|---|---|---|---|---|---|
| 4,755,820 | A | * | 7/1988 | Backhouse et al. | 343/700 MS |
| 5,398,037 | A | * | 3/1995 | Engheta et al. | 343/872 |
| 5,764,199 | A | * | 6/1998 | Ricardi | 343/911 R |
| 6,198,450 | B1 | * | 3/2001 | Adachi et al. | 343/753 |
| 6,323,824 | B1 | | 11/2001 | Heinrichs et al. | |
| 6,344,829 | B1 | * | 2/2002 | Lee | 343/753 |
| 6,452,565 | B1 | | 9/2002 | Kingsley et al. | |
| 6,590,544 | B1 | * | 7/2003 | Filipovic | 343/753 |
| 2001/0043158 | A1 | | 11/2001 | Adachi et al. | |

OTHER PUBLICATIONS

Chow, et al., "Cylindrical Dielectric Resonator Antenna Array", Electronics Letters, IEE Stevenage, GB vol. 31, No. 18., Aug. 31, 1995, pp. 1536-1537.

Ittipiboon, et al., "Aperture Fed Rectangular and Triangular Dielectric Resonators for use as Magnetic Dipole Antennas", Electronics Letters, 1993, 29, (23), pp. 102-2002.

Junker, G.P., Kishk, A.A. and Glisson A.W.: "Numerical analysis of dielectric resonator antennas excited in the quasi-TE modes", Electronics Letters, 1993, 29, (21), pp. 1810-1811.

Kajfez, D. and Guillon, P.(Eds): "Dielectric resonators", Artech House, Inc, Norwood, MA, 1986.

Kingsley, S.P., O'Keefe S.G. and Saario S.: "Characteristics of half volume TE mode cylindrical dielectric resonator antennas", to be published in IEEE Transactions on Antennas and Propagation, Jan. 2002.

Kingsley, S.P. and O'Keefe, S.G., "Beam steering and monopulse processing of probe-fed dielectric resonator antennas", IEE Proceedings—Radar Sonar and Navigation, 146, 3, 121-125, 1999.

Kishk, A.A., Junker, G.P. and Glisson A.W.: "Study of broadband dielectric resonator antennas", Published in Antenna applications Symposium, 1999, p. 45.

Kranenburg, R.A. and Long, S.A.: "Microstrip Transmission Line Excitation of Dielectric Resonator Antennas", Electronics Letters, 1994, 24, (18), pp. 1156-1157.

Long, S.A., McAllister, M.W., and Shen, L.C.: "The Resonant Cylindrical Dielectric Cavity Antenna", IEEE Transactions on Antennas and Propagation, AP-31, 1983, pp. 406-412.

Leung, K.W., Lo, H.Y., Luk, K.M. and Yung, E.K.N.: "Two-dimensional cylindrical dielectric resonator antenna array", Electronic Letters, 1998, 34, (13), pp. 1283-1285.

McAllister, M.W., Long, S.A. and Conway G.L.: "Rectangular Dielectric Resonator Antenna", Electronics Letters, 1983, 19, (6), pp. 218-219.

Mongla, et al., "Dielectric Resonator Antennas—A Review and General Design Relations for Resonant Frequency and Bandwidth", International Journal of Microwave and Millimeter-Wave Computer-Aided Engineering, 1994, 4, (3), pp. 230-247.

Mongia, et al., "A Half-Split Cylindrical Dielectric Resonator Antenna Using Slot-Coupling", IEEE Microwave and Guided Wave Letters, 1993, 3, (2), pp. 38-39.

Mongia, et al., "Theoretical and Experimental Investigations on Rectangular Dielectric Resonator Antennas", IEEE Transactions on Antennas and Propagation, IEEE Inc., New York, US, vol. 45, No. 9.

Petosa, A., Ittipiboon, A. and Cuhaci, M.: "Array of circular-polarized cross dielectric antennas", Electronics Letters, 1996, 32, (19), pp. 1742-1743.

Petosa, A., Mongia, R.K., Ittipiboon, A. and Wight, J.S.: "Design of microstrip-fed series array of dielectric resonator antennas", Electronics Letters, 1995, 31, (16), pp. 1306-1307.

Petosa, A., Ittipiboon, A., Cuhaci, M. and Larose, R.: "Bandwidth improvement for microstrip-fed series array of dielectric resonator antennas", Electronics Letters, 1996, 32, (7), pp. 608-609.

Wu, Z.; Davis, L.E. and Drossos, G.: "Cylindrical dielectric resonator antenna arrays", Proceedings of ICAP—11th International Conference on Antennas and Propagation, 2001, p. 668.

Birand, M.T. and Gelsthorpe, R.V.: "Experimental millimetric array using dielectric radiators fed by means of dielectric waveguide", Electronics Letters, 1983, 17, (18), pp. 633-635, no month.

Chow, et al., "Cylindrical Dielectric Resonator Antenna Array", Electronics Letters, IEE Stevenage, GB vol. 31, No. 18., Aug. 31, 1995, pp. 1536-1537.

Ittipiboon, et al., "Aperture Fed Rectangular and Triangular Dielectric Resonators for use as Magnetic Dipole Antennas", Electronics Letters, 1993, 29, (23), pp. 102-2002, no month.

Junker, G.P., Kishk, A.A. and Glisson A.W.: "Numerical analysis of dielectric resonator antennas excited in the quasi-TE modes", Electronics Letters, 1993, 29, (21), pp. 1810-1811, no month.

Kajfez, D. and Guillon, P.(Eds): "Dielectric resonators", Artech House, Inc, Norwood, MA, 1986, no month.

Kingsley, S.P., O'Keefe S.G. and Saario S.: "Characteristics of half volume TE mode cylindrical dielectric resonator antennas", to be published in IEEE Transactions on Antennas and Propagation, Jan. 2002.

Kingsley, S.P. and O'Keefe, S.G., "Beam steering and monopulse processing of probe-fed dielectric resonator antennas", IEE Proceedings—Radar Sonar and Navigation, 146, 3, 121-125, 1999, no month.

Kishk, A.A., Junker, G.P. and Glisson A.W.: "Study of broadband dielectric resonator antennas", Published in Antenna applications Symposium, 1999, p. 45, no month.

Kranenburg, R.A. and Long, S.A.: "Microstrip Transmission Line Excitation of Dielectric Resonator Antennas", Electronics Letters, 1994, 24, (18), pp. 1156-1157, no month.

Long, S.A., McAllister, M.W., and Shen, L.C.: "The Resonant Cylindrical Dielectric Cavity Antenna", IEEE Transactions on Antennas and Propagation, AP-31, 1983, pp. 406-412, no month.

Leung, K.W., Lo, H.Y., Luk, K.M. and Yung, E.K.N.: "Two-dimensional cylindrical dielectric resonator antenna array", Electronics Letters, 1998, 34, (13), pp. 1283-1285, no month.

McAllister, M.W., Long, S.A. and Conway G.L.: "Rectangular Dielectric Resonator Antenna", Electronics Letters, 1983, 19, (6), pp. 218-219, no month.

Mongia, et al., "Dielectric Resonator Antennas—A Review and General Design Relations for Resonant Frequency and Bandwidth", International Journal of Microwave and Millimeter-Wave Computer-Aided Engineering, 1994, 4, (3), pp. 230-247, no month.

Mongia, et al., "A Half-Split Cylindrical Dielectric Resonator Antenna Using Slot-Coupling", IEEE Microwave and Guided Wave Letters, 1993, 3, (2), pp. 38-39, no month.

Mongia, et al., "Theoretical and Experimental Investigations on Rectangular Dielectric Resonator Antennas", IEEE Transactions on Antennas and Propagation, IEEE Inc., New York, US, vol. 45, No. 9, no date.

Petosa, A., Ittipiboon, A. and Cuhaci, M.: "Array of circular-polarized cross dielectric resonator antennas", Electronics Letters, 1996, 32, (19), pp. 1742-1743, no month.

Petosa, A., Mongia, R.K., Ittipiboon, A. and Wight, J.S.: "Design of microstrip-fed series array of dielectric resonator antennas", Electronics Letters, 1995, 31, (16), pp. 1306-1307, no month.

Petosa, A., Ittipiboon, A., Cuhaci, M. and Larose, R.: "Bandwidth improvement for microstrip-fed series array of dielectric resonator antennas", Electronics Letters, 1996, 32, (7), pp. 608-609, no month.

Wu, Z.; Davis, L.E. and Drossos, G.: "Cylindrical dielectric resonator antenna arrays", Proceedings of ICAP—11th International Conference on Antennas and Propagation, 2001, p. 668, no month.

* cited by examiner

Far field radiation pattern [dBi]

DIELECTRIC RESONATOR ANTENNA

PRIOR APPLICATION DATA

The present application is a national phase application of International Application PCT/GB03/01326, entitled "DIELECTRIC RESONATOR ANTENNA" filed on Mar. 26, 2003, which in turn claims priority from United Kingdom application 0207052.2, filed on Mar. 26, 2002, both of which are incorporated by reference in their entirety.

FIELD OF THE INVENTION

The present invention relates to a dielectric resonator antenna (DRA) configured so as to be capable of operating in modes such as $EH_{11\delta}$, $TE_{02\delta}$, $TE_{02}$, $TE_{01}$ and hybrid modes, and also to arrays of such DRAs in which the patterns of the individual DRA elements are configured so as to endow the overall array pattern with special properties designed to meet the requirements of certain applications.

BACKGROUND OF THE INVENTION

Introduction to DRAs

Dielectric resonator antennas are resonant antenna devices that radiate or receive radio waves at a chosen frequency of transmission and reception, as used for example in mobile telecommunications. In general, a DRA consists of a volume of a dielectric material (the dielectric resonator) disposed on or close to a grounded substrate, with energy being transferred to and from the dielectric material by way of monopole probes inserted into the dielectric material or by way of monopole aperture feeds provided in the grounded substrate (an aperture feed is a discontinuity, generally rectangular in shape, although oval, oblong, trapezoidal 'H' shape, '<->' shape, or butterfly/bow tie shapes and combinations of these shapes may also be appropriate, provided in the grounded substrate where this is covered by the dielectric material. The aperture feed may be excited by a strip feed in the form of a microstrip transmission line, grounded or ungrounded coplanar transmission line, triplate, slotline or the like which is located on a side of the grounded substrate remote from the dielectric material). Direct connection to and excitation by a microstrip transmission line is also possible. Alternatively, dipole probes may be inserted into the dielectric material, in which case a grounded substrate may not be required. By providing multiple feeds and exciting these sequentially or in various combinations, a continuously or incrementally steerable beam or beams may be formed, as discussed for example in the present applicant's co-pending U.S. patent application Ser. No. 09/431,548 and the publication by KINGSLEY, S. P. and O'KEEFE, S. G., "Beam steering and monopulse processing of probe-fed dielectric resonator antennas", IEE Proceedings—Radar Sonar and Navigation, 146, 3, 121–125, 1999, the full contents of which are hereby incorporated into the present application by reference.

The resonant characteristics of a DRA depend, inter alia, upon the shape and size of the volume of dielectric material and also on the shape, size and position of the feeds thereto. It is to be appreciated that in a DRA, it is the dielectric material that resonates when excited by the feed, this being due to displacement currents generated in the dielectric material. This is to be contrasted with a dielectrically loaded antenna, in which a traditional conductive radiating element is encased in a dielectric material that modifies the resonance characteristics of the radiating element, but without displacement currents being generated in the dielectric material and without resonance of the dielectric material.

DRAs may take various forms and can be made from several candidate materials including ceramic dielectrics.

Introduction to DRA Arrays

Since the first systematic study of dielectric resonator antennas (DRAs) in 1983 [LONG, S. A., McALLISTER, M. W., and SHEN, L. C.: "The Resonant Cylindrical Dielectric Cavity Antenna", IEEE Transactions on Antennas and Propagation, AP-31, 1983, pp 406–412], interest has grown in their radiation patterns because of their high radiation efficiency, good match to most commonly used transmission lines and small physical size [MONGIA, R. K. and BHARTIA, P.: "Dielectric Resonator Antennas—A Review and General Design Relations for Resonant Frequency and Bandwidth", International Journal of Microwave and Millimetre-Wave Computer-Aided Engineering, 1994, 4, (3), pp 230–247].

The majority of configurations reported to date have used a slab of dielectric material mounted on a grounded substrate or ground plane excited by either a single aperture feed in the ground plane [ITTIPIBOON, A., MONGIA, R. K., ANTAR, Y. M. M., BHARTIA, P. and CUHACI, M: "Aperture Fed Rectangular and Triangular Dielectric Resonators for use as Magnetic Dipole Antennas", Electronics Letters, 1993, 29, (23), pp 2001–2002] or by a single probe inserted into the dielectric material [McALLISTER, M. W., LONG, S. A. and CONWAY G. L.: "Rectangular Dielectric Resonator Antenna", Electronics Letters, 1983, 19, (6), pp 218–219]. Direct excitation by a transmission line has also been reported by some authors [KRANENBURG, R. A. and LONG, S. A.: "Microstrip Transmission Line Excitation of Dielectric Resonator Antennas", Electronics Letters, 1994, 24, (18), pp 1156–1157].

The concept of using a series of DRAs to build an antenna array has already been explored by several authors. For example, an array of two cylindrical single-feed DRAs has been demonstrated [CHOW, K. Y., LEUNG, K. W., LUK, K. M. AND YUNG, E. K. N.: "Cylindrical dielectric resonator antenna array", Electronics Letters, 1995, 31, (18), pp 1536–1537] and then extended to a square matrix of four DRAs [LEUNG, K. W., LO, H. Y., LUK, K. M. AND YUNG, E. K. N.: "Two-dimensional cylindrical dielectric resonator antenna array", Electronics Letters, 1998, 34, (13), pp 1283–1285]. A square matrix of four cross DRAs has also been investigated [PETOSA, A., ITTIPIBOON, A. AND CUHACI, M.: "Array of circular-polarized cross dielectric resonator antennas", Electronics Letters, 1996, 32, (19), pp 1742–1743]. Long linear arrays of single-feed DRAs have also been investigated with feeding by either a dielectric waveguide [BIRAND, M. T. AND GELSTHORPE, R. V.: "Experimental millimetric array using dielectric radiators fed by means of dielectric waveguide", Electronics Letters, 1983, 17, (18), pp 633–635] or a microstip [PETOSA, A., MONGIA, R. K., ITTIPIBOON, A. AND WIGHT, J. S.: "Design of microstrip-fed series array of dielectric resonator antennas", Electronics Letters, 1995, 31, (16), pp 1306–1307]. This last research group has also found a method of improving the bandwidth of microstrip-fed DRA arrays [PETOSA, A., ITTIPIBOON, A., CUHACI, M. AND LAROSE, R.: "Bandwidth improvement for microstrip-fed series array of dielectric resonator antennas", Electronics Letters, 1996, 32, (7), pp 608–609]. A study has also been made recently of different configurations that can be used to form cylindrical dielectric resonator antenna broadside arrays [WU, Z.; DAVIS, L. E. AND DROSSOS, G.: "Cylindrical dielectric resonator antenna arrays", Proceedings of ICAP—11th International Conference on Antennas and Propagation, 2001, p. 668.]

It is important to note that the papers above have focused mainly on methods of feeding mechanisms for arrays of DRA elements and examining the benefits of such arrays for various applications. None of these publications has discussed the concept put forward in the present application, which is that of generating a specific DRA excitation mode in order to generate a specific far-field pattern that in turn enables a specific array geometry to be constructed.

Introduction to the Half-split DRA

A problem with designing miniature dielectric resonator antennas for portable communications systems (e.g. mobile telephone handsets and the like) is that high dielectric materials must be used to make the antennas small enough to be physically compatible with the portable communications system. This in turn often leads to the antenna being too small in bandwidth. It is important therefore to identify DRA geometries and modes having low radiation quality factors and which are therefore inherently wide bandwidth radiating devices. It has been known for some time that the half-split cylindrical DRA is one such device see [JUNKER, G. P., KISHK, A. A. AND GLISSON A. W.: "Numerical analysis of dielectric resonator antennas excited in the quasi-TE modes", Electronics Letters, 1993, 29, (21), pp 1810–1811] or [KAJFEZ, D. AND GUILLON, P.(Eds): "Dielectric resonators", Artech House, Inc, Norwood, Mass., 1986.]. FIG. 1 of the present application shows the half-split DRA geometry and is taken from [KINGSLEY, S. P., O'KEEFE S. G. AND SAARIO S.: "Characteristics of half volume TE mode cylindrical dielectric resonator antennas", to be published in IEEE Transactions on Antennas and Propagation, January 2002]. FIG. 1 shows a grounded conductive substrate 1 on which is disposed a half cylindrical dielectric resonator 2, with its rectangular surface 3 adjacent to the grounded substrate 1. The dielectric resonator 2 has a thickness d and a radius a, and is fed with a single probe 4 inserted into the rectangular surface 3 at a distance from a centre point of the surface 3. The resonator 2 also has a pair of semi-circular surfaces 5. The bandwidth of these half-split antennas has been the particular subject of a study [KISHK, A. A., JUNKER, G. P. AND GLISSON A. W.: "Study of broadband dielectric resonator antennas", Published in Antenna applications Symposium, 1999, p. 45.] and bandwidths as high as 35% were reported for some configurations.

Using Half-split Cylindrical DRAs to Form an Array

The most common mode used for the half-split cylindrical DRA is the TE or quasi TE mode, which has the radiation patterns described in [KINGSLEY, S. P., O'KEEFE S. G. AND SAARIO S.: "Characteristics of half volume TE mode cylindrical dielectric resonator antennas", to be published in IEEE Transactions on Antennas and Propagation, January 2002] or [JUNKER, G. P., KISHK, A. A. AND GLISSON A. W.: "Numerical analysis of dielectric resonator antennas excited in the quasi-TE modes", Electronics Letters, 1993, 29, (21), pp 1810–1811]. In this mode, the direction of maximum radiation is along the long axis of the antenna. To form an antenna array from these elements, it is necessary to stack the elements 2 side by side with their long semi-circular faces 5 parallel to each other as shown in FIG. 2*a*. This gives minimum coupling between the elements 2—a requirement for good array design. This is a good way to form a horizontal array with vertical polarisation, but when the antenna array is turned vertically to from the type of array needed for mobile communications applications, for example, the array becomes horizontally polarised, as shown in FIG. 2*b*. Generally speaking, vertical polarisation is preferred to horizontal polarisation in many mobile communications applications as it gives better propagation at low elevation angles.

SUMMARY

What is required is a resonant mode that has a null in the radiation pattern that lies along the long axis of the half-cylinder dielectric element such that a plurality of such elements can be configured as shown in FIG. 2*c*. Further, it is preferred that such a mode is excited by mounting the dielectric resonator on or close to a slot in the grounded substrate (ground plane), since this is a simpler and lower cost method of production assembly than using probe feeding. The mode required has the same pattern shapes as the $HEM_{11\delta}$ mode reported in [KISHK, A. A., JUNKER, G. P. AND GLISSON A. W.: "Study of broadband dielectric resonator antennas", published in Antenna applications Symposium, 1999, p. 45.] but with the opposite polarisation. The required mode corresponds to the pattern that would be created by a horizontal electric dipole and is the $EH_{11\delta}$ mode. Unfortunately, although it has been reported in the academic press that the $EH_{11\delta}$ is a possible mode of a half-split cylindrical DRA [MONGIA R. K., et. al.: "A half-split cylindrical dielectric resonator antenna using slot-coupling", IEEE Microwave and Guided Wave Letters, 1993, 3, (2), pp. 38–39], there have been no publications describing how it may be excited. Indeed, it is a difficult mode to excite, because the plane of symmetry is required to be magnetic rather than electric and so a simple conducting substrate or groundplane containing a probe or slot or similar feed structure cannot be used.

An improved DRA and a method of efficiently slot feeding the $EH_{11\delta}$ mode in a half-split cylindrical DRA has been found by the present applicants and is presented in this patent application. This method may also apply to DRAs having dielectric resonators with shapes other than half-split cylindrical.

According to a first aspect of the present invention, there is provided a dielectric resonator antenna comprising a dielectric resonator having a substantially planar longitudinal surface and a grounded substrate having first and second opposed surfaces with a dielectric substrate adjacent to the second surface, wherein:

i) the grounded substrate includes a slot extending longitudinally in a first direction and having a predetermined width;

ii) the dielectric resonator is arranged such that its longitudinal surface is disposed close to the first surface of the grounded substrate with a gap between the surfaces, and with an end region of the longitudinal surface overlying the width of the slot;

iii) a majority of the longitudinal surface of the dielectric resonator is provided with a conductive layer, the end region of the longitudinal surface being free of the conductive layer; and iv) a strip feed line is provided on the dielectric substrate on the second surface of the grounded substrate, the strip feed line being substantially coextensive with the longitudinal surface of the dielectric resonator and extending beyond the width of the slot in the grounded substrate.

According to a second aspect of the present invention, there is provided a method of manufacturing a dielectric resonator antenna comprising a dielectric resonator having a substantially planar longitudinal surface and a grounded substrate having first and second opposed surfaces with a dielectric substrate adjacent to the second surface, wherein:

i) a slot is formed in the grounded substrate, the slot extending longitudinally in a first direction and having a predetermined width;

ii) a stip feed line is provided on the dielectric substrate on the second surface of the grounded substrate, the strip feed line being generally perpendicular to the slot in the grounded substrate and having one end that extends beyond the width of the slot;

iii) a conductive layer is coated onto a majority of the longitudinal surface of the dielectric resonator, leaving an end region of the longitudinal surface free of the conductive layer;

iv) the dielectric resonator is arranged such that its longitudinal surface is disposed close to the first surface of the grounded substrate with a gap between the surfaces, and with the end region of the longitudinal surface overlying the width of the slot;

v) the dielectric resonator antenna is connected to a resonance analyser and the dielectric resonator is moved about over the first surface of the grounded substrate until a resonance position is found where a predetermined resonance mode is detected by the resonance analyser;

vi) the longitudinal surface of the dielectric resonator is adhered to the first surface of the grounded substrate in the resonance position with an adhesive laden with a conductive material; and vii) the end of the strip feed line extending beyond the slot in the grounded substrate is tied back until the predetermined resonance mode measured by the resonance analyser predominates over other possible resonance modes.

Preferably, the DRA is configured to operate in an $EH_{11\delta}$ resonance mode, although other modes, including a $TE_{02}$ or $TE_{02\delta}$ mode, a $TE_{01}$ mode and hybrid modes, may also be excited by way of embodiments of the present invention. The resonance mode is generally influenced by the size and shape of the dielectric resonator element and also by the configuration of the feeding mechanism.

The gap between the longitudinal surface of the resonator and the first surface of the grounded substrate may be substantially filled with a conductive adhesive in operational embodiments of the present invention, although the gap may in principle be filled with any appropriate material, including air and other appropriate materials. Nevertheless, a small gap, even if only a few microns in dimension, is required to launch the predetermined resonance mode, given that a magnetic rather than an electric plane of symmetry is required.

Optionally, exposed surfaces of the dielectric resonator, once it is mounted on the grounded substrate, may be removed (possibly by way of filing or grinding) so as to enhance the $EH_{11\delta}$ resonance mode or other resonance modes by increasing their frequency. For example, where the dielectric resonator has a half-split cylindrical configuration with its rectangular basal surface being the longitudinal surface, a top portion of its curved surface may be removed by grinding or filing so as to leave a flattened upper surface. Preferably, when applying this technique, the dielectric resonator is initially oversized (thereby having a resonance frequency that is lower than the desired frequency), and the grinding or filing process therefore helps to tune the DRA by increasing the resonant frequency of the $EH_{11\delta}$ or other resonance modes to the desired frequency.

In currently preferred embodiments, the dielectric resonator is a half-split cylindrical resonator having its rectangular basal surface as the longitudinal surface. However, other dielectric resonator geometries may also generate the desired $EH_{11\delta}$ resonance mode or other modes when appropriately positioned and tuned. The present applicant has found that a half-split cylindrical resonator having a flattened or ground down curved surface, and/or with tapered or sloping side surfaces, may provide improvements in bandwidth and the like. Other possible dielectric resonator geometries include rectangular and triangular (e.g. oblongs or triangular prisms). These may also be flattened or ground down or chamfered and/or provided with tapered or sloping side surfaces.

The dielectric substrate may be of the type used for manufacturing printed circuit boards (PCBs).

The strip line feed is preferably a microstrip line feed.

The resonance analyser may be a vector network analyser.

The conductive coating may be applied as a metallised paint, for example a silver loaded paint, and is preferably applied as two coats. However, different metals and combinations thereof may be painted onto different dielectric resonators depending on the materials used for the resonator. In preferred embodiments, the dielectric resonator is made of a ceramic material, but other dielectric materials may be used where appropriate.

Instead of slot feeding, a direct microstrip feeding mechanism may be used.

According to a third aspect of the present invention, there is provided a dielectric resonator antenna comprising a dielectric resonator having a substantially planar longitudinal surface, a dielectric substrate having first and second opposed surfaces with a conductive groundplane being provided on the second surface and a direct microstrip feedline being provided on the first surface so as to extend longitudinally therealong, the dielectric resonator being mounted on the first surface such that the planar longitudinal surface of the dielectric resonator contacts the direct microstrip feedline and is coextensive therewith.

The direct microstrip feedline preferably extends beyond the longitudinal surface of the dielectric resonator along the first surface of the dielectric substrate so as to provide an overhang. The length of the overhang may be varied so as to tune the DRA to particular frequencies. The overhang may curve in the plane of the dielectric substrate or may be straight. The overhang may be connected to a capacitor (indeed, the overhang itself acts as a capacitor) for additional tuning.

All or part of the longitudinal planar surface of the dielectric resonator may be provided with a conductive layer, for example a metallised paint or the like. Where only part of the longitudinal planar surface is provided with a conductive layer, the conductive layer is preferably applied so as to match the width of the direct microstrip feedline. Small pads of conductive material may be provided at corner portions of the longitudinal planar surface so as to improve mechanical stability on the first surface of the dielectric substrate. Alternatively, no conductive layer at all is provided on the longitudinal planar surface.

Depending on the geometry of the dielectric resonator and the presence or absence or configuration of the conductive layer on the dielectric resonator, a DRA of the third aspect of the present invention may be made to resonate in an EH mode, a $TE_{01}$ mode, a $TE_{02}$ mode or hybrid modes.

The advantage of direct microstrip feeding is that good bandwidth is obtained while still retaining the advantages of having a conductive groundplane on the second surface of the dielectric substrate (that is, low radiation through the groundplane and good resistance to detuning of the DRA). The DRA of the third aspect of the present invention is particularly easy to manufacture.

One of the main benefits of creating the $EH_{11\delta}$ mode is that a plurality of DRAs operating in this mode can be formed into an array of the type shown in FIG. 2*c*, discussed above. In this array, the DRA elements 2 are positioned in an end-to-end linear array, the array as a whole preferably being disposed vertically with respect to a direction of terrestrial gravity. The array works well because each DRA element has nulls or near nulls along the directions of its longitudinal surface, and adjacent DRA elements do not therefore tend to couple electromagnetically to any great extent during operation.

According to a fourth aspect of the present invention, there is provided an array of dielectric resonator antennas in accordance with the first or third aspects of the present invention, the antennas being arranged in the array such that the longitudinal surfaces of the dielectric resonators are substantially colinear.

The array is preferably configured such that the longitudinal surfaces are substantially colinear within a given plane, with the dielectric resonators facing in the same direction. The array is preferably configured as a vertical array, that is, the longitudinal surfaces of the dielectric resonators are substantially colinear and generally perpendicular to a given terrestrial ground plane.

When the linear array is disposed vertically, the radiation pattern of each DRA element in a horizontal plane is nearly omnidirectional, thereby giving good azimuth coverage. Furthermore, the elevation pattern of each DRA element may have a well-defined beam width (in some cases just 55 degrees) thereby also giving good control of the radiation pattern for mobile communications applications. The vertical linear array can give a narrow elevation pattern and is most efficient if each individual DRA element also has as narrow a radiation pattern as possible in elevation so that the element power is not radiated in directions to which the array does not point.

A further advantage of the array is that a vertical monopole-type antenna can be constructed that is nearly omnidirectional, but which has higher gain than can be obtained using dipoles. A typical vertical electric dipole may have a peak element gain of about 2 dBi and array of five such dipoles, for example, would have a total peak gain of about 9 dBi. The DRA elements of embodiments of the present invention have been found to have gains of up to 4 dBi (even higher gains may potentially be achieved), and thus an array of these elements will have a total peak gain of about 11 dBi while still retaining the good azimuth coverage of the dipoles. It is possible that further development of the DRA elements may lead to even further gain improvements in future.

DESCRIPTION OF THE DRAWINGS

For a better understanding of the present invention and to show how it may be carried into effect, reference shall now be made by way of example to the accompanying drawings, in which.

DETAILED DESCRIPTION OF THE INVENTION

FIGS. 1, 2*a*, 2*b* and 2*c* have been discussed in the introduction to the present application.

Figure 3:
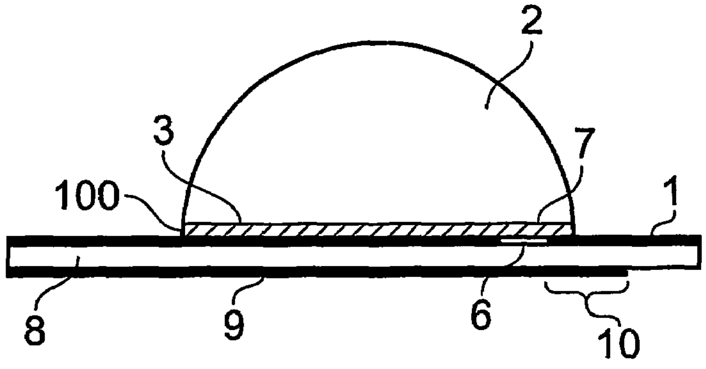
FIG. 3 shows a vertical section through a DRA of the present invention provided with a slot feed.
Figure 4:
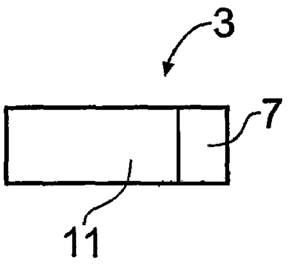
FIG. 4 shows a longitudinal surface of a dielectric resonator of the DRA of FIG. 3.

FIG. 3 shows a preferred DRA of the present invention comprising a grounded conductive substrate 1 over which is disposed a half-split cylindrical ceramic dielectric resonator 2 having a longitudinal rectangular surface 3 disposed just over the grounded substrate 1. The grounded dielectric substrate 1 includes a slot 6 formed therein, the slot 6 extending longitudinally in a direction substantially perpendicular to the orientation of the longitudinal surface 3 of the resonator 2, with one end 7 of the longitudinal surface 3 positioned over the slot 6. The grounded substrate 1 is disposed on a first side of a dielectric substrate 8, which may be a printed circuit board (PCB). A microstrip feed line 9 is provided on a second side of the dielectric substrate 8, the feed line 9 being substantially coextensive with the longitudinal surface 3 of the resonator 2 and extending slightly beyond the width of the slot 6, the portion 10 of the feed line 9 extending beyond the slot 6 being defined as the "overhang". All but the end region 7 of the longitudinal surface 3 of the resonator 2 is painted with a metallised paint 11 as shown in FIG. 4. The metallised paint 11 may be loaded with silver or other metals, and is preferably applied as two coats. The end region 7 of the longitudinal surface 3 may be masked prior to painting so as to keep the end region 7 free of paint 11. Furthermore, the longitudinal surface 3 is adhered to the grounded substrate 1 by way of a metallised adhesive 100, which may also be loaded with silver.

An embodiment of the present invention that has been constructed and tested by the present applicant will now be described. A half-split cylindrical ceramic dielectric resonator 2 having a relative permittivity of approximately 110, a radius of 7.5 mm and a longitudinal surface 3 of length 20 mm by width 7 mm, was fitted onto a grounded substrate 1 having a slot 6 of length 18 mm and width 2 mm. Prior to fitting the resonator 2 onto the grounded substrate 1, all but an end region 7 of the longitudinal surface 3 was coated with two layers of silver-laden paint 11, the end region 7 having a length at least as great as the width of the slot 6. A microstrip feed line 9 was mounted on the other side of the PCB 8 so as to be coextensive with the longitudinal surface 3 of the resonator, and to extend beyond the slot 6 by an overhang 10, the length of the overhang 10 being approximately 1 to 2 mm. The grounded substrate 1 was mounted on a standard FR4 PCB 8 using a silver-laden adhesive 100. Upon teting, the DRA was found to operate (resonate) at a frequency of 2382 MHz. The peak gain was 2.9 dBi, the S11 return loss was 144 MHz at the −10 dB points and the S21 transmission bandwidth was many hundreds of MHz to the −3 dB points.

Figure 5:
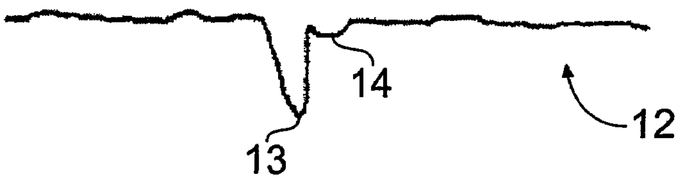
FIG. 5 shows a first signal trace from a vector network analyser used to construct the DRA of FIG. 3.

When constructing the DRA described above, various tuning operations were carried out. After coating the longitudinal surface 3 with the paint 11, but prior to affixing the resonator 2 with the adhesive 100, the resonator 2 was placed approximately in position over the grounded substrate 1, and the grounded substrate 1 was connected to a vector network analyser (VNA) (not shown). The resonator 2 was then moved about over the grounded substrate 1 until the VNA displayed a trace 12 as shown in FIG. 5. The trace 12 showed a main resonance mode 13 (which was not the required $EH_{11\delta}$ mode) and a small dip at 14, which was the required $EH_{11\delta}$ mode.

Once the correct position was found, the longitudinal surface 3 of the resonator 2 was adhered to the grounded substrate 1 using the silver-laden adhesive 100. The VNA remained connected to the DRA so as to ensure that the correct positioning was again located and the adhesive 100 was allowed to dry.

Figure 6:
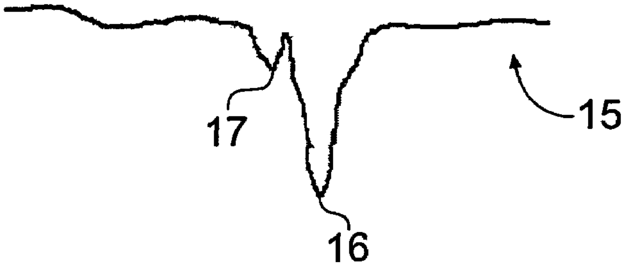
FIG. 6 shows a second signal trace from a vector network analyser used to construct the DRA of FIG. 3.

Once the adhesive 100 was dry, the overhang 10 of the feed line 9 was cut back to less than 2 mm so as to tune the DRA. As the overhang 10 was being cut back or shortened, the VNA displayed a trace 15 as shown in FIG. 6, the trace 15 having a main resonance mode 16 which was the required $EH_{11\delta}$ mode (compare with FIG. 5), and a much reduced dip at 17, which corresponded to the unwanted resonance mode 13 of FIG. 5.

Figure 1:
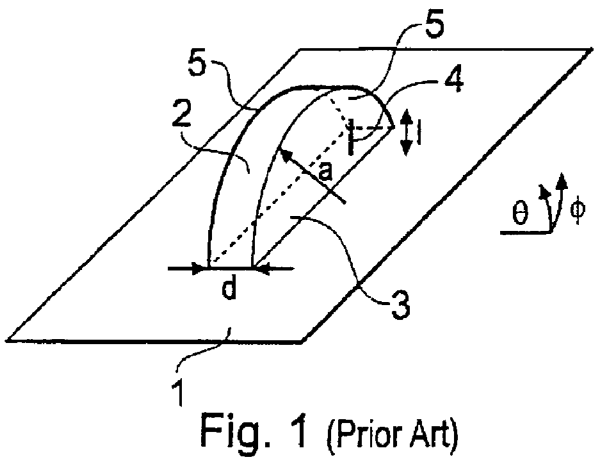
Fig. 1 (Prior Art)
FIG. 1 shows a prior art half-split cylindrical DRA.
Figure 2A:
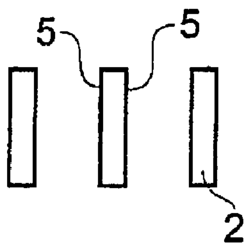
Fig. 2a (Prior Art)
FIG. 2*a* shows a plan view of a horizontal array formed by three DRAs as shown in FIG. 1.
Figure 2B:
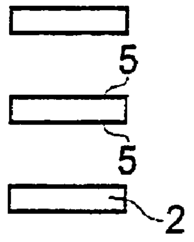
Fig. 2b (Prior Art)
FIG. 2*b* shows a side elevation of a vertical array formed by three DRAs as shown in FIG. 1.
Figure 2C:
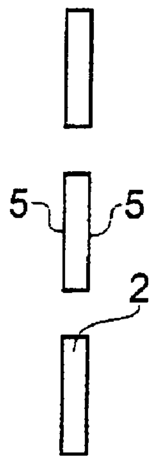
Fig. 2c (Prior Art)
FIG. 2*c* shows a side elevation of a desired vertical array configuration.
Figure 7:
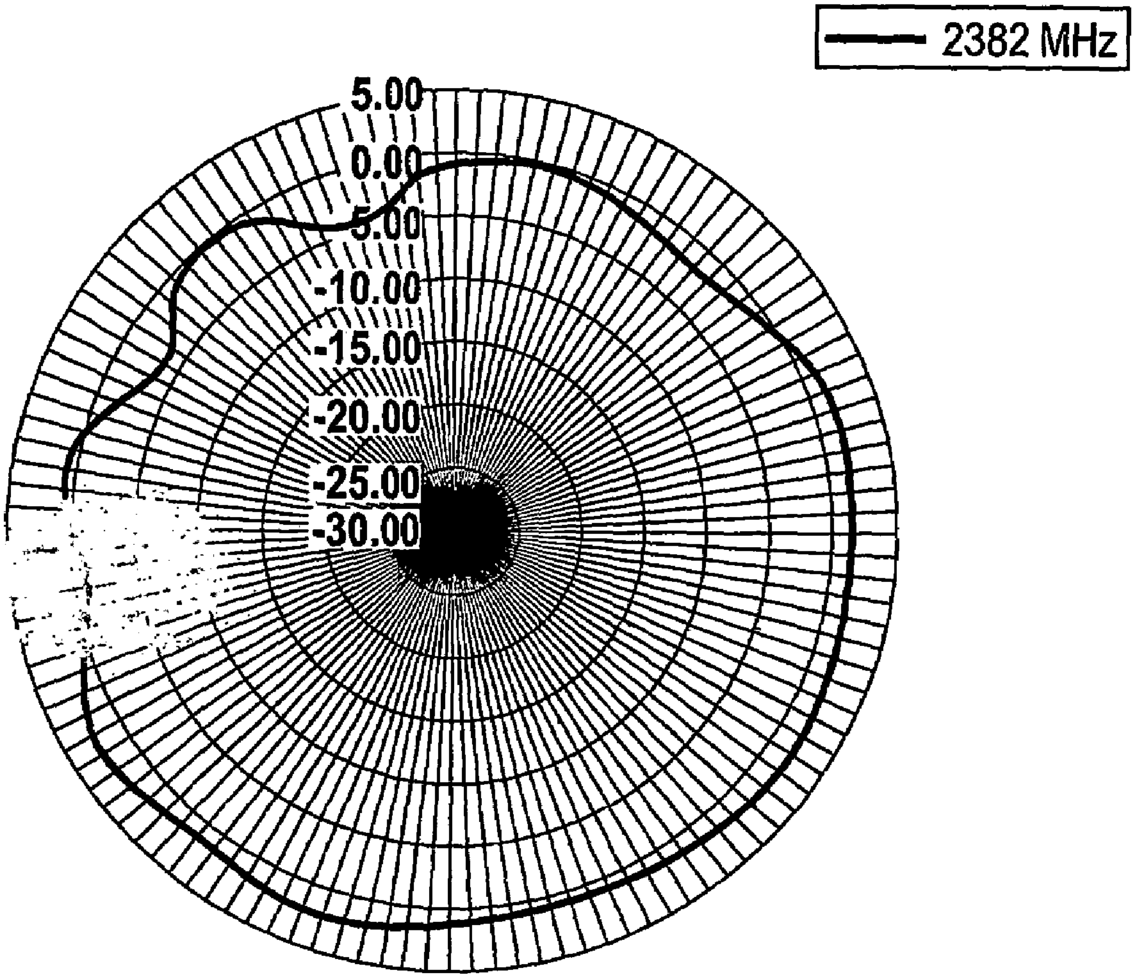
FIG. 7 shows a y-z co-polar far field radiation pattern for the DRA of FIG. 3, measured with horizontal polarisation.
Figure 8:
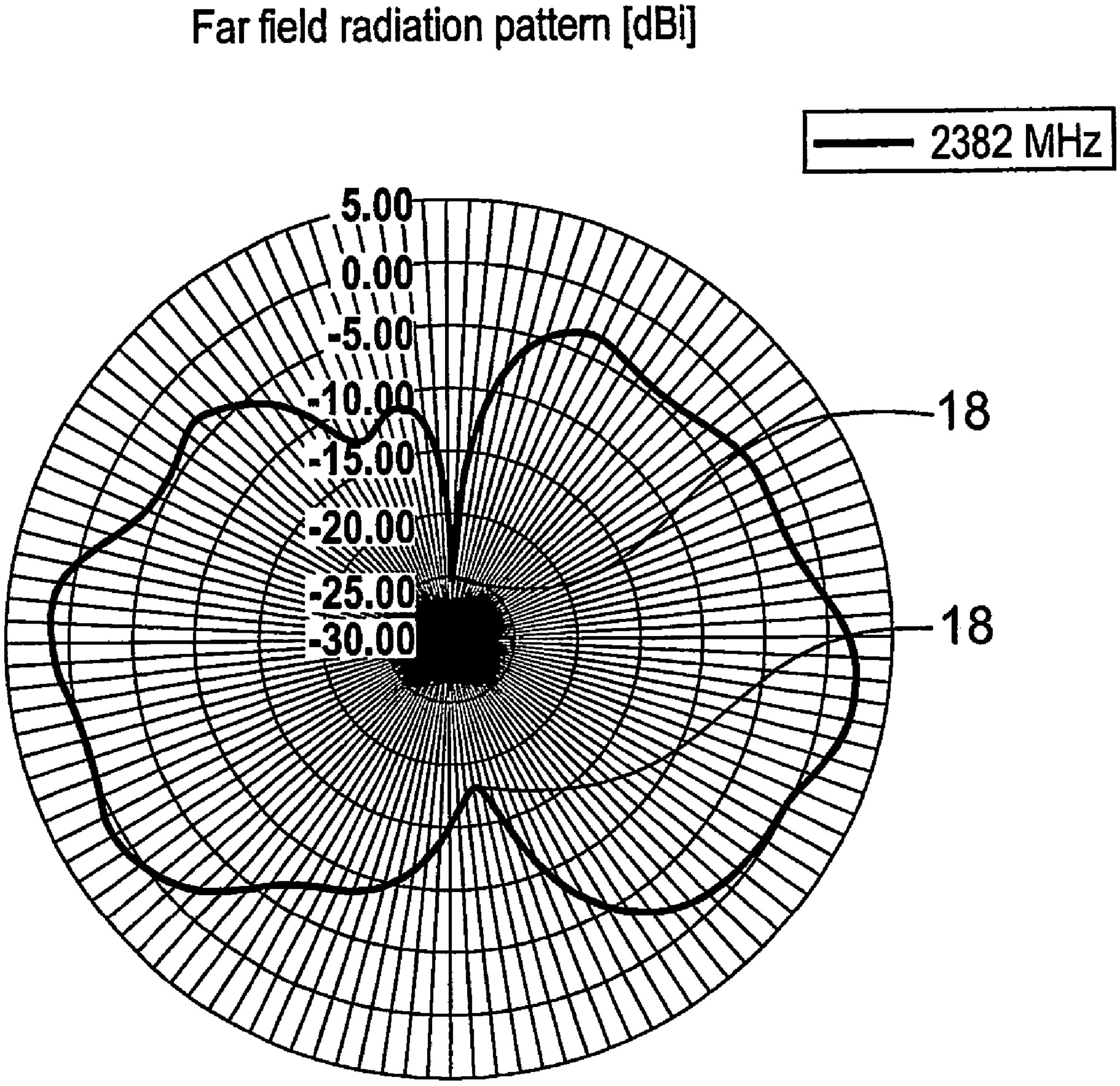
FIG. 8 shows an x-y co-polar far field radiation pattern for the DRA of FIG. 3, measured with horizontal polarisation.
Figure 9:
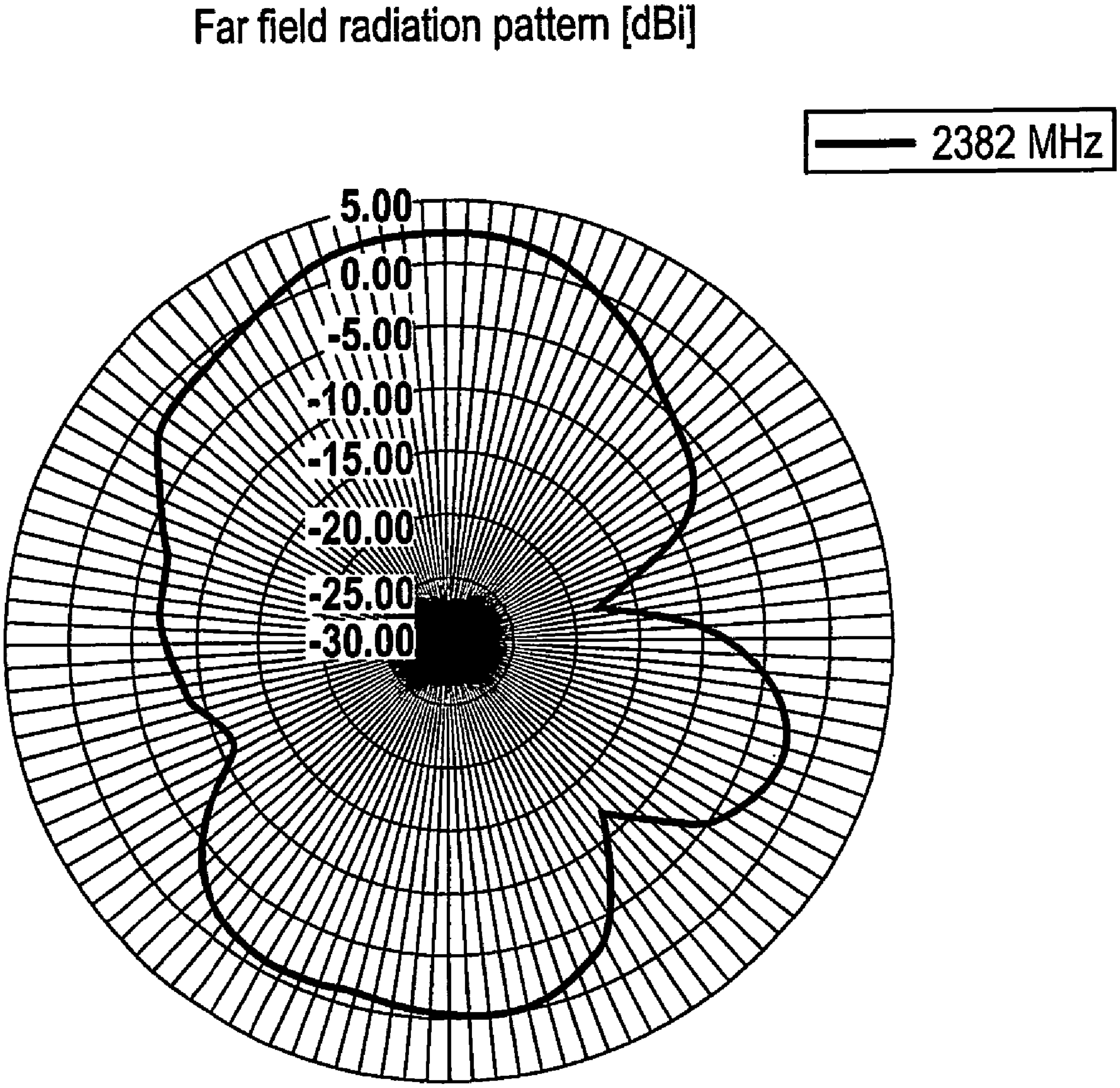
FIG. 9 shows an x-z co-polar far field radiation pattern for the DRA of FIG. 3, measured with horizontal polarisation.

The three principal radiation patterns of the DRA are shown in FIGS. 7 to 9, all measured with horizontal polarisation with respect to the grounded substrate 1. FIG. 7 shows that the radiation pattern in the horizontal plane is nearly omnidirectional. FIG. 8 (x axis is vertical, y axis is left to right) shows the nulls or near-nulls 18 in the radiation pattern that confirm that the DRA is acting like a horizontal electric dipole with a significant null in the x direction, thereby enabling a linear array of the elements to be constructed, as shown in FIG. 2*c*. The horizontal polarisation becomes vertical when the linear array is disposed vertically, thereby giving the array pattern required for mobile communications applications. Finally, FIG. 9 (z axis is vertical) shows that the elevation radiation pattern of each DRA has a beam width of just 55°, thereby giving good control of the radiation pattern for mobile communications applications.

Figure 10:
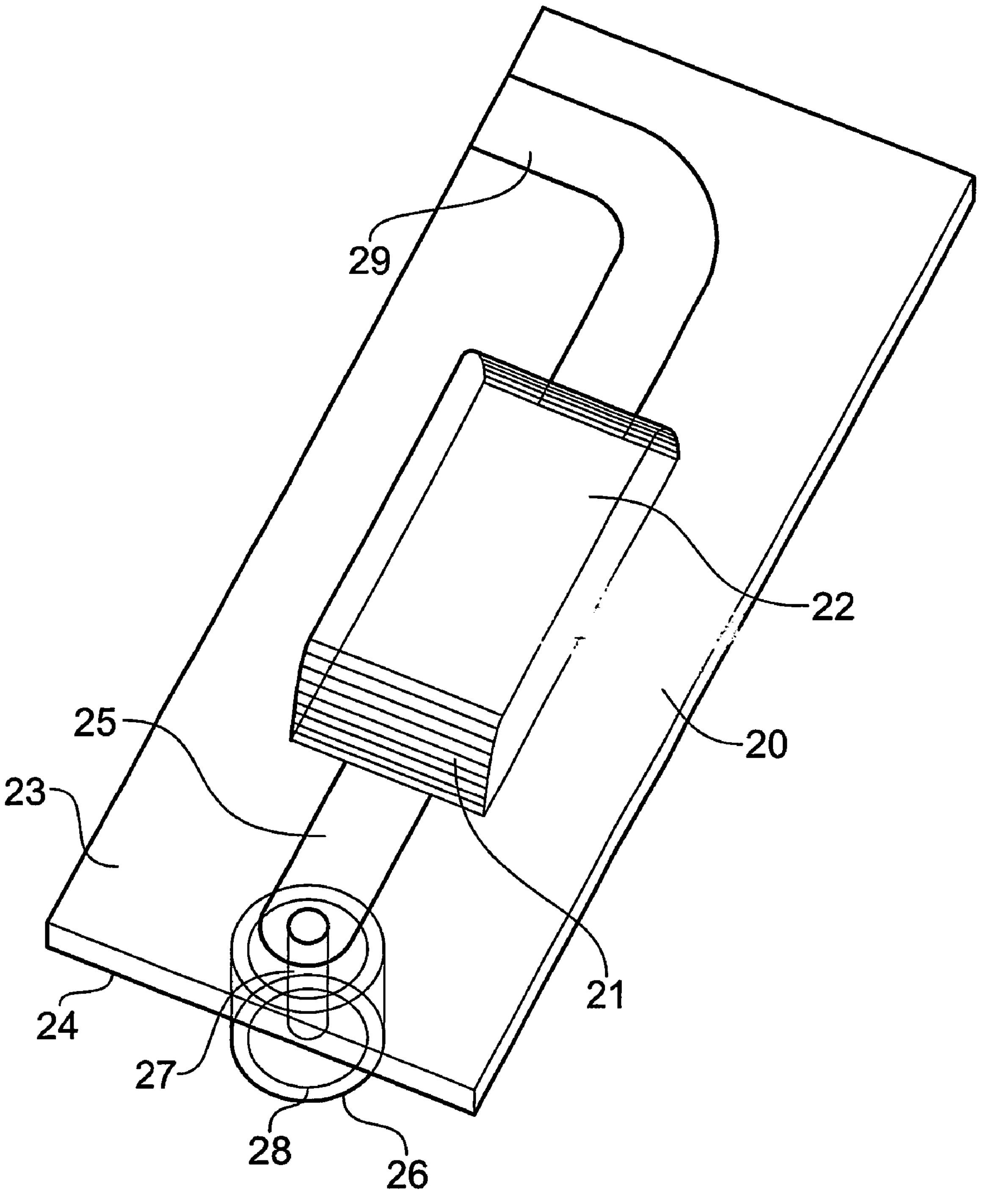
FIG. 10 shows a DRA of the present invention provided with a direct microstrip feedline.

FIG. 10 shows an alternative DRA configuration in which the desired resonance modes may be excited. A half-split cylindrical ceramic dielectric resonator 20 with its curved surface 21 ground down to provide a plateau 22 is mounted with its planar longitudinal surface on a first side of a dielectric substrate 23. A second side of the dielectric substrate 23, opposed to the first, is provided with a conductive groundplane 24. The first side of the dielectric substrate 23 is provided with a conductive direct microstrip feedline 25 that passes underneath the longitudinal surface of the resonator 20 and is coextensive and generally parallel therewith. The direct microstrip feedline 25 is provided with a connector 26 mounted on the second side of the dielectric substrate 23 and in electrical contact with the feedline 25 by way of a signal pin 27. The connector 26 also includes an earth connection 28 for connection to the conductive groundplane 24, the earth connection 28 and the signal pin 27 being insulated from each other. The feedline 25 extends beyond the resonator 20 along the first surface of the dielectric substrate 23 to provide an overhang 29. The length of the overhang 29 may be varied so as to tune the DRA to specific frequencies by providing different capacitance effects. The overhang 29 is shown with a curved configuration in the plane of the substrate 23, but may alternatively have a straight configuration. The longitudinal surface of the resonator 20 may be fully coated with a metallic paint (not shown), or partially coated with a metallic paint along the line of the feedline 25, or not provided with any metallic paint at all.

The preferred features of the invention are applicable to all aspects of the invention and may be used in any possible combination.

Throughout the description and claims of this specification, the words "comprise" and "contain" and variations of the words, for example "comprising" and "comprises", mean "including but not limited to", and are not intended to (and do not) exclude other components, integers, moieties, additives or steps.

The invention claimed is:

1. A dielectric resonator antenna comprising a dielectric resonator having a substantially planar longitudinal surface and a grounded substrate having first and second opposed surfaces with a dielectric substrate adjacent to the second surface, wherein:

i) the grounded substrate includes a slot extending longitudinally in a first direction and having a predetermined width;

ii) the dielectric resonator is arranged such that its longitudinal surface is disposed close to the first surface of the grounded substrate with a gap between the surfaces, and with an end region of the longitudinal surface overlying the width of the slot;

iii) a majority of the longitudinal surface of the dielectric resonator is provided with a conductive layer, the end region of the longitudinal surface being free of the conductive layer; and iv) a strip feed line is provided on the dielectric substrate on the second surface of the grounded substrate, the strip feed line being substantially coextensive with the longitudinal surface of the dielectric resonator and extending beyond the width of the slot in the grounded substrate.

2. An antenna as claimed in claim 1, wherein the antenna resonates in an $EH_{11\delta}$, mode during operation thereof.

3. An antenna as claimed in claim 1, wherein the dielectric resonator has a half cylindrical configuration with a rectangular basal surface thereof being the longitudinal surface.

4. An antenna as claimed in claim 1, wherein the dielectric resonator is formed from a half cylindrical dielectric resonator with a rectangular basal surface thereof being the longitudinal surface and a surface opposed to the rectangular basal surface being flattened so as to form a plateau.

5. An antenna as claimed in claim 1, wherein the dielectric resonator has an oblong configuration with a rectangular basal surface thereof being the longitudinal surface.

6. An antenna as claimed in claim 1, wherein the dielectric resonator has a triangular prismatic configuration with a rectangular basal surface thereof being the longitudinal surface.

7. An antenna as claimed in claim 1, wherein the dielectric resonator is formed from a triangular prismatic dielectric resonator with a rectangular basal surface thereof being the longitudinal surface and a surface opposed to the rectangular basal surface being flattened so as to form a plateau.

8. An antenna as claimed in claim 1, wherein the conductive layer includes a metallised paint.

9. An antenna as claimed in claim 1, wherein the longitudinal surface of the dielectric resonator is adhered to the grounded substrate with an adhesive loaded with a conductive material, the adhesive defining the gap between the surfaces.

10. An array of dielectric resonator antennas as claimed in claim 1, the antennas being arranged in the array such that the longitudinal surfaces of the dielectric resonators are substantially colinear.

11. An array as claimed in claim 10, wherein the longitudinal surfaces are aligned in a direction generally perpendicular to a given terrestrial ground plane.

12. An array as claimed in claim 11, wherein the array generates a radiation pattern with vertical polarisation.

13. A method of manufacturing a dielectric resonator antenna the antenna comprising a dielectric resonator having a substantially planar longitudinal surface and a grounded substrate having first and second opposed surfaces with a dielectric substrate adjacent to the second surface, the method comprising:

forming a slot in the grounded substrate, the slot extending longitudinally in a first direction and having a predetermined width;

providing a strip feed line on the dielectric substrate on the second surface of the grounded substrate, the strip feed line being generally perpendicular to the slot in the grounded substrate and having one end that extends beyond the width of the slot;

coating a conductive layer onto a majority of the longitudinal surface of the dielectric resonator, leaving an end region of the longitudinal surface free of the conductive layer;

arranging the dielectric resonator such that its longitudinal surface is disposed close to the first surface of the grounded substrate with a gap between the surfaces, and with the end region of the longitudinal surface overlying the width of the slot;

connecting the dielectric resonator to a resonance analyser and moving the dielectric resonator about over the first surface of the grounded substrate until a resonance position is found where a predetermined resonance mode is detected by the resonance analyser;

adhering the longitudinal surface of the dielectric resonator to the first surface of the grounded substrate in the resonance position with an adhesive laden with a conductive material; and trimming the end of the strip feed line extending beyond the slot in the grounded substrate until the predetermined resonance mode measured by the resonance analyser predominates over other possible resonance modes.

14. A method according to claim 13, wherein the predetermined resonance mode is an $EH_{11\delta}$ resonance mode.

15. A method according to claim 13, wherein the dielectric resonator has a half cylindrical configuration with a rectangular basal surface and a curved surface, the rectangular basal surface being the longitudinal surface.

16. A method according to claim 15, wherein the curved surface of the dielectric resonator is flattened so as to form a plateau.

17. A method according to claim 13, wherein the dielectric resonator has a triangular prismatic configuration with a rectangular basal surface and an apex opposed to rectangular basal surface, the rectangular basal surface being the longitudinal surface.

18. A method according to claim 17, wherein the apex of the dielectric resonator is flattened so as to form a plateau.

19. A method according to claim 13, wherein the dielectric resonator has an oblong configuration with a rectangular basal surface, the rectangular basal surface being the longitudinal surface.

20. A method according to claim 13, wherein the conductive layer is applied as a metallised paint.

21. A method according to claim 13, wherein the resonance analyser is a vector network analyser.

22. A method according to claim 13, wherein the curved surface or apex of the dielectric resonator is flattened by grinding or filing so as to increase a resonant frequency of the antenna.

23. A dielectric resonator antenna comprising a dielectric resonator having a substantially planar longitudinal surface, a dielectric substrate having first and second opposed surfaces with a conductive groundplane being provided on the second surface and a direct microstrip feedline being provided on the first surface so as to extend longitudinally therealong, the dielectric resonator being mounted on the first surface such that the planar longitudinal surface of the dielectric resonator contacts the direct microstrip feedeline and is coextensive therewith, wherein substantially all of the longitudinal planar surface of the dielectric resonator is provided with a conductive layer.

24. An antenna as claimed in claim 23, wherein the direct microstrip feedline extends beyond the longitudinal surface of the dielectric resonator along the first surface of the dielectric substrate so as to provide an overhang.

25. An antenna as claimed in claim 24, wherein the overhang curves in a plane of the dielectric substrate.

26. An antenna as claimed in claim 24, wherein the overhang is substantially straight.

27. An antenna as claimed in claim 26, wherein the conductive layer is a metallised paint.

28. A dielectric resonator antenna comprising a dielectric resonator having a substantially planar longitudinal surface, a dielectric substrate having first and second opposed surfaces with a conductive groundplane being provided on the second surface and a direct microstrip feedline being provided on the first surface so as to extend longitudinally therealong, the dielectric resonator being mounted on the first surface such that the planar longitudinal surface of the dielectric resonator contacts the direct microstrip feedline and is coextensive therewith, wherein the antenna resonates in an EH mode during operation thereof.

29. A dielectric resonator antenna comprising a dielectric resonator having a substantially planar longitudinal surface, a dielectric substrate having first and second opposed surfaces with a conductive groundplane being provided on the second surface and a direct microstrip feedline being provided on the first surface so as to extend longitudinally therealong, the dielectric resonator being mounted on the first surface such that the planar longitudinal surface of the dielectric resonator contacts the direct microstrip feedline and is coextensive therewith, wherein only a part of the longitudinal planar surface of the dielectric resonator that contacts the direct microstrip feedline is provided with a conductive layer.

* * * * *